United States Patent Office 2,975,026
Patented Mar. 14, 1961

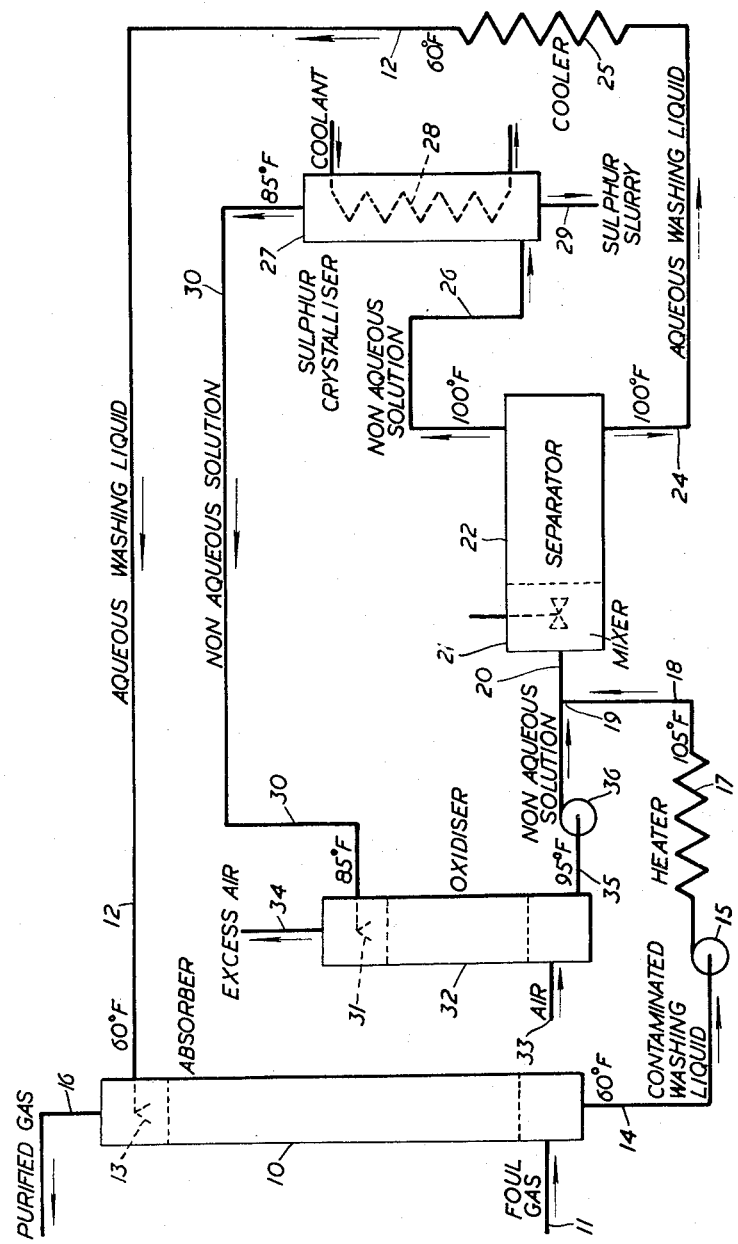

2,975,026

REMOVING HYDROGEN SULPHIDE FROM GASES

John Eric Mills, Twickenham, England, assignor to The Gas Council, London, England, a British body corporate Filed Nov. 17, 1958, Ser. No. 774,371

Claims priority, application Great Britain Nov. 18, 1957

9 Claims. (Cl. 23—3)

This invention relates to a process of, and apparatus for, removing hydrogen sulphide from gases, more particularly, but not exclusively, from coal gas.

A process is known for removing hydrogen sulphide from gases, particularly coal gas, which consists in alternately washing the gases with a solution or suspension of an organic compound which will yield a readily oxidisable reduction product on contact with hydrogen sulphide, and bringing the solution or suspension containing the reduction product into contact with air or oxygen so that the reduction product is converted back to the original compound. The net effect of the process may be represented by the equation:

$$2H_2S + O_2 \rightarrow 2H_2O + 2S$$

Among the organic compounds proposed for use in the said process were certain organic dyes which are basic in character normally available in the form of salts, such as those of the azine, thiazine, oxazine and triphenylmethane classes, for instance methylene blue chloride, methylene violet and Meldola's blue.

In the present applicant's United States patent application Serial No. 568,975, filed March 2, 1956, now Patent 2,868,617, it has been proposed to use for this purpose dye bases derived from the said dyes by the neutralization of the reduction products of the salts of said dyes.

For such dyes and dye bases suitable solvents are aniline, cresylic acid or any of the phenolic constituents of cresylic acid either individually or mixed, and the xylenols.

One problem which has been encountered in such processes is loss of solvent to the gases during the washing operation. Another problem, which is more marked with aniline than with cresylic and xylenol solvents, is that there may be side reactions between the solvent and reactive constituents in the gas, such as unsaturated compounds and carbon disulphide.

It is an object of this invention to provide an improved process which avoids these problems.

A further object is to provide apparatus suitable for carrying out the improved process.

According to one aspect of the present invention, a process for removing hydrogen sulphide from a gas comprises washing the gas with an aqueous washing liquid which will absorb hydrogen sulphide, regenerating the washing liquid by contacting it with a solution in a non-aqueous solvent immiscible with the washing liquid of an organic dye or dye base which will yield a readily oxidisable reduction product on contact with the hydrogen sulphide in the washing liquid, separating the non-aqueous solution containing the reduction product from the aqueous washing liquid, and regenerating the separated non-aqueous solution by bringing it into contact with air or oxygen which converts the reduction product back to the dye or dye base.

The regenerated washing liquid, freed from hydrogen sulphide, can be recycled for washing the gas, while the regenerated non-aqueous solution containing the reconstituted dye or dye base can be recycled for regenerating used washing liquid.

The washing liquid is conveniently one of those conventionally employed for scrubbing hydrogen sulphide from gases. Suitable washing liquids include aqueous solutions of ammonia or alkali metal salts of weak acids such as carbonic, boric, phosphoric and carbolic acids, or aqueous solutions or organic bases such as ethanolamines. Other washing liquids which may be used include aqueous solutions of alkali metal salts of aminocarboxylic acids such as glycine or alanine.

The dye or dye base may be any of those referred to above.

The non-aqueous solvent for the dye or dye base must be immiscible with the selected washing liquid, and may be any of those referred to above. The solvent selected must be unreactive with any constituent of the selected washing liquid in its fresh state. For instance, cresylic acid should not be used with a washing liquid containing an organic base such as ethanolamine. The preferred solvent is aniline, since its solutions extract hydrogen sulphide from the washing liquids more rapidly than do the other solvents mentioned. Also, aniline separates more readily from an aqueous washing liquid than does cresylic acid, for example.

The present invention solves the problems referred to above. There are no significant losses of non-aqueous solvent to the gas since this solvent never comes into contact with the gas. For the same reason there are no side reactions between the non-aqueous solvent and reactive constituents in the gas. A further advantage of the invention is that hydrogen sulphide is absorbed from the gas more rapidly in many of the aqueous washing liquids mentioned than in a non-aqueous solution of one of the said dyes or dye bases, which enables a relatively small absorber to be employed.

The invention also provides advantages over known hydrogen sulphide absorption processes employing aqueous washing liquids of the kinds mentioned, since all such processes require large quantities of heat for regenerating the washing liquids. Also, such processes do not completely remove hydrogen sulphide from the gas since it is uneconomical completely to remove hydrogen sulphide from the washing liquid during regeneration. In the two-stage process of the present invention hydrogen sulphide is practically completely removed from the washing liquid without the use of heat, and the thus fully regenerated washing liquid is capable of practically completely removing hydrogen sulphide from the gas.

The separation of the non-aqueous solution from the aqueous washing liquid is conveniently effected by gravity separation into two phases. Gravity separation can be expedited by adding a neutral soluble salt to the washing liquid to increase the difference in density between the washing liquid and the non-aqueous solution.

The non-aqueous solution may be cooled in order to separate sulphur therefrom by crystallisation.

The process can be carried out at atmospheric pressure or at an elevated pressure.

According to another aspect of the invention, apparatus for separating hydrogen sulphide from a gas comprises a first circuit through which an aqueous washing liquid can be circulated including an absorber for bringing the washing liquid into contact with the gas to absorb hydrogen sulphide from the gas, a mixer for mixing the washing liquid containing absorbed hydrogen sulphide with a non-aqueous solution containing an organic dye or dye base and wherein the hydrogen sulphide reacts with the dye or dye base to yield a readily oxidisable reduction product which remains in the non-aqueous solution and the aqueous washing liquid is thereby regenerated, and a separator for separating the regenerated aqueous washing liquid from the non-aqueous solution; and a second circuit through which the said non-aqueous solution can be circulated including the said mixer, the said separator, and an oxidiser for bringing the non-aqueous solution into contact with air or oxygen for oxidising the said reduction product back to the dye or dye base.

The second circuit may also include a sulphur crystalliser wherein the non-aqueous solution is cooled and sulphur separated from it by crystallisation.

The invention may be performed in various ways, and one specific form of apparatus and process embodying the invention will now be described by way of example with reference to the accompanying flow diagram.

The apparatus and process illustrated in the diagram are for the purification of coal gas by the removal therefrom of hydrogen sulphide.

The apparatus consists of an absorber tower 10 packed with wooden grids, to which foul gas (i.e. coal gas containing hydrogen sulphide) is admitted at the bottom through a pipe 11 and to which an aqueous washing liquid at a temperature of about 60° F. is admitted at the top through a pipe 12 and a sprayer 13. The washing liquid descending the tower 10 absorbs hydrogen sulphide from the ascending gas, and the contaminated washing liquid is drawn off at the bottom through a pipe 14 containing a pump 15. The purified gas is discharged from the top of the absorber tower 10 through a pipe 16.

The contaminated washing liquid is pumped by the pump 15 through a heater 17 which raises its temperature to about 105° F. The hot contaminated washing liquid passes from the heater 17 through a pipe 18 to join, at the junction 19, a stream of a non-aqueous solution of a dye or dye base at a temperature of about 59° F. flowing through a pipe 20. The non-aqueous solution also contains some dissolved sulphur, for a reason to be described later. The mixture enters a mixer 21 where thorough mixing occurs, and the hydrogen sulphide content of the contaminated aqueous washing liquid is taken up by the dye or dye base in the non-aqueous solution, the hydrogen sulphide reducing the dye or dye base to a reduction product which remains in solution in the non-aqueous solvent. The mixture then passes into a separator 22 where the non-aqueous phase separates out as an upper layer from the aqueous phase which forms a lower layer. The upper layer consists of the non-aqueous solvent, the said reduction compound and dissolved sulphur, while the lower layer consists of purified aqueous washing liquid. Both layers are at a temperature of approximately 100° F.

The aqueous washing liquid is run off from the separator 22 through a pipe 24 to a cooler 25 which reduces its temperature to about 60° F. From the cooler 25 the cooled washing liquid passes into the pipe 12, and its cycle is repeated.

The upper layer in the separator 22 is drawn off through a pipe 26 and is passed through a sulphur crystalliser 27 wherein it is cooled, by cooling water flowing through a cooling coil 28, to a temperature of about 85° F. The crystalliser 27 contains sulphur crystals, and the drop in temperature of about 15° F. to which the non-aqueous solution is subjected in the crystalliser causes some of its sulphur content to come out of solution and crystallise out on the existing crystals. A slurry of sulphur crystals is periodically drawn off from the crystalliser 27 through a pipe 29. The non-aqueous solution, partially freed from dissolved sulphur, leaves the crystalliser 27 through a pipe 30 and is discharged through a sprayer 31 into the top of an oxidiser tower 32 packed with wooden grids. Air is blown into the bottom of the oxidiser tower through a pipe 33 and flows upwardly through the oxidiser tower in counter-current to the descending solution. The oxygen in the air oxidizes the said reduction product and so restores the dye or dye base to its original form, releasing sulphur which remains in solution in the non-aqueous solvent. The excess air passes out of the top of the tower through a pipe 34. The oxidation reaction is exothermic, the temperature of the non-aqueous solution being raised from about 85° F. to about 95° F. in its descent through the tower. The non-aqueous solution is drawn off from the bottom of the tower through a pipe 35 by a pump 36. From this pump the non-aqueous solution passes into the pipe 20 and its cycle is repeated.

The aqueous washing liquid preferably comprises a solution of sodium carbonate and sodium bicarbonate, the solution being normal with respect to sodium. With coal gas containing about 2% carbon dioxide, at equilibrium 60% of the sodium in the solution would be as the bicarbonate. In addition, the solution may contain a neutral water-soluble salt such as potassium chloride amounting, for instance, to from 20% to 25% by weight of the said sodium salts. The purpose of this neutral salt is to increase the specific gravity of the aqueous solution and so aid in the gravity separation of the aqueous solution from the non-aqueous solution in the separator 22.

The non-aqueous solution preferably consists of a solution of methylene blue base in aniline, of a concentration of about 4% by weight.

For the removal of hydrogen sulphide from coal gas containing about 600 grains of hydrogen sulphide per 100 cubic feet of gas down to a level of 1.5 parts of hydrogen sulphide per million, at a rate of treatment of about one million cubic feet of gas per hour, the following data are appropriate, using the solutions described above.

| | |
|---|---|
| Rate of circulation of aqueous washing solution | 60,000 gallons per hour. |
| Rate of circulation of non-aqueous solution | 30,000 gallons per hour. |
| Residence time of solution in separator | 15 minutes. |
| Dimensions of absorber tower | 11 ft. diameter, 75 ft. high. |
| Dimension of oxidizer tower | 5 ft. diameter, 40 ft. high. |
| Rate of air flow through oxidizer tower | 75,000 cu. ft. per hour. |
| Dimensions of crystallizer | 6 ft. diameter, 16 ft. high. |

The temperatures set forth above and indicated in the flow diagram are not critical; however, it is preferred that the temperature of the non-aqueous solution entering the crystalliser should be about 100° F. since this permits the use of water at ordinary temperatures for cooling the crystalliser. The desired temperature of the non-aqueous solution entering the crystalliser determines to some extent the temperatures employed at other places in the plant. If desired, part of the heating in the heater 17, and part of the cooling in the coolers 25 or 28 or both, can be effected by means of heat exchangers.

What I claim as my invention and desire to secure by Letters Patent is:

1. A process for removing hydrogen sulphide from a gas which comprises washing said gas with an aqueous alkaline washing liquid which absorbs hydrogen sulphide from said gas, regenerating said aqueous washing liquid containing absorbed hydrogen sulphide by contacting same with a solution comprising a non-aqueous solvent immiscible with said aqueous washing liquid and having dissolved therein an organic substance selected from the group consisting of azine, thiazine, oxazine and triphenylmethane dyes and dye bases obtained by the neutralization of the reduction product of said dyes, whereby said hydrogen sulphide absorbed in said aqueous washing liquid reacts with said organic substance to form a reduction product which remains in solution in said non-aqueous solvent, separating the non-aqueous solution consisting of said non-aqueous solvent containing said reduction product dissolved therein from said regenerated aqueous washing liquid, and regenerating said separated non-aqueous solution by contacting same with a gas selected from the group consisting of air and oxygen whereby said reduction product is oxidised back to said organic substance.

2. A process according to claim 1 in which said organic substance is methylene blue base.

3. A process according to claim 1 in which said non-aqueous solvent is selected from the group consisting of aniline, cresylic acid, phenolic constituents of cresylic acid, the xylenols and mixtures thereof.

4. A process according to claim 1 in which said aqueous alkaline washing liquid consists of a solution of sodium carbonate and sodium bicarbonate.

5. A process according to claim 1 which comprises recycling said regenerated aqueous alkaline washing liquid for washing further gas.

6. A process according to claim 1 which comprises recycling said regenerated non-aqueous solution for regenerating further aqueous alkaline washing liquid containing absorbed hydrogen sulphide.

7. A process according to claim 1 in which said separation of said non-aqueous solution from said aqueous washing liquid is a gravity separation, and said aqueous alkaline washing liquid contains a neutral water-soluble salt dissolved therein which increases its specific gravity.

8. A process according to claim 7 in which said neutral water-soluble salt is potassium chloride.

9. A process according to claim 1 which includes the step of cooling said non-aqueous solution, whereby sulphur dissolved therein is separated therefrom by crystallisation.

References Cited in the file of this patent

UNITED STATES PATENTS

| | | |
|---|---|---|
| 1,936,570 | Bragg | Nov. 28, 1933 |
| 2,432,301 | Fetterly | Dec. 9, 1947 |
| 2,557,643 | Fetterly | June 19, 1951 |

FOREIGN PATENTS

| | | |
|---|---|---|
| 693,278 | Great Britain | June 24, 1953 |